(12) United States Patent
Usui

(10) Patent No.: US 6,173,190 B1
(45) Date of Patent: Jan. 9, 2001

(54) SIGNAL RECEIVING APPARATUS AND METHOD

(75) Inventor: Takashi Usui, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 08/987,103

(22) Filed: Dec. 8, 1997

(51) Int. Cl.[7] .............................. H04B 1/38; H04B 1/02
(52) U.S. Cl. ..................... 455/562; 455/103; 455/132; 455/277.1; 455/503
(58) Field of Search .................... 455/103, 132, 455/133, 134, 135, 272, 277.1, 277.2, 503, 561, 562; 342/368, 359, 360; 370/334, 339, 499

(56) References Cited

U.S. PATENT DOCUMENTS

| | | | | |
|---|---|---|---|---|
| 5,095,535 | * | 3/1992 | Freeburg | 455/277.1 |
| 5,303,240 | * | 4/1994 | Borras et al. | 455/277.1 |
| 5,684,491 | * | 11/1997 | Newman et al. | 455/277.1 |
| 5,873,048 | * | 2/1999 | Yun | 455/277.1 |
| 5,924,022 | * | 7/1999 | Beasley et al. | 455/218 |
| 5,978,362 | * | 11/1999 | Lee et al. | 370/315 |

FOREIGN PATENT DOCUMENTS 9213398   8/1992  (EP) ................. H04B 7/00

OTHER PUBLICATIONS

Michael Tangemann, et al., "Comparison of Upgrade Techniques for Mobile Communication Systems", May 1, 1994, International Conference on Communications, 1994 IEEE, pp. 201–205.

* cited by examiner

Primary Examiner—Nay Maung
(74) Attorney, Agent, or Firm—Jay H. Maioli

(57) ABSTRACT

A signal transmitting/receiving method and apparatus freed of the drawback of the conventional information multiplexing method (FDMA, TDMA or CDMA) that information multiplexing needs a bandwidth broader than the bandwidth of the original information, such that, if the bandwidth is scanty, the number of channels that can be accommodated is decreased. A signal transmission device 10 sends three different items of the transmission information, namely the transmission information items $T_A$, $T_B$ and $T_C$, from three transmitters $11_A$, $11_B$ and $11_C$, by multiplexing communication via three different paths $P_A$, $P_B$ and $P_C$, using a transmission antenna unit 12. A signal receiving device 20 receives the three different information items $T_A$, $T_B$ and $T_C$, transmitted via three different paths $P_A$, $P_B$ and $P_C$, by receivers $22_A$, $22_B$, $22_C$, using a receiving antenna unit 21, for obtaining three different items of the reception information, namely the reception information items $R_A$, $R_B$ and $R_C$.

19 Claims, 10 Drawing Sheets

US 6,173,190 B1

SIGNAL RECEIVING APPARATUS AND METHOD

BACKGROUND OF THE INVENTION

1. Field of the Invention

This invention relates to a signal transmitting/receiving method and apparatus, applied with advantage to a portable telephone system, a cordless telephone system and an inside radio communication system.

2. Related Art

Since the bandwidth of radio communication is finite, attempts have so far been made for developing a radio system having high frequency utilization efficiency. For this reason, a multiplication technique of synthesizing plural different items of the information and transmitting the resulting multiplexed signal has become widely known. Among the multiplexing techniques, there are a frequency-division multiplexing access (FDMA) system, a time-division multiplexing access (TDMA) system and a code-division multiplexing access (CDMA) system.

The FDMA system is such a communication method in which each modulation wave modulates a separate sub-carrier wave having its frequency separated a certain width. That is, in FDMA, signals occupying non-overlapping frequency ranges are summed together. By using different frequency bands, two or more separate signals can be transmitted by one and the same transmission channel. A desired signal can be taken out by a filter. This multiplexing system is not in need of synchronization.

The TDMA is a communication system in which a transmission device uses the common channel intermittently and a channel is established in a specified receiver device by an automatic distribution function. Specifically, signals compressed to high-speed burst signals are arranged in specified time slots in such a manner as to evade temporal overlap. The desired signal is reproduced on extracting the time slots. The system is synchronized because timing reference is required.

The CDMA is a multiplexing communication method employing insignia (identifiable properties or codes) proper to the signals. Demultiplexing is by utilizing code correlation characteristics with previously known reference signals. The signals handled with this system are usually digital signals.

If, in the above-described FDMA, TDMA or CDMA, the information is multiplexed, there is needed a band broader than the bandwidth of the original signals. If it is attempted with these systems to transmit 4-channel signals, for example, with 32 kbps, a band of 32 kbps is required, thus leading to an extremely high transmission rate.

In the conventional practice, if it is attempted to transmit the information simultaneously within one and the same band from the same site to some other same site, the band needs to be enlarged as compared to the bandwidth of the original information. Thus, if the bandwidth is limited, the number of channels that can be accommodated is restricted.

SUMMARY OF THE INVENTION

It is therefore an object of the present invention to provide a signal transmission method and apparatus whereby multiplexing is realized using the same frequency without enlarging the information bandwidth for improving the frequency utilization efficiency for realization of a large-capacity radio communication system.

In one aspect, the present invention provides a signal transmission/reception device including a transmitting antenna having N directivities, N transmission means associated with the directivities of the transmission antenna, a receiving antenna having N directivities associated with the respective directivities of the transmitting antenna and N reception means associated with the directivities of the receiving antenna, wherein N different information items transmitted from the N transmission means via N different paths associated with the N directivities of the transmitting antenna are received via receiving antennas with the N directivities as multiplexed signals. With the signal transmission/reception device of the present invention, signal multiplexing can be realized with the same frequency without enlarging the information bandwidth for increasing the frequency utilization efficiency while realizing a large-capacity radio communication system.

In another aspect, the present invention provides a signal transmission/reception method wherein N different information items are transmitted via N different paths associated with N directivities of a transmission antenna and wherein the transmitted information is received as multiplexed signal by a receiving antenna having N directivities associated with N directivities of the transmission antenna. With the signal transmission/reception method of the present invention, signal multiplexing can be realized with the same frequency without enlarging the information bandwidth for increasing the frequency utilization efficiency while realizing a large-capacity radio communication system.

DESCRIPTION OF PREFERRED EMBODIMENTS

Figure 1:
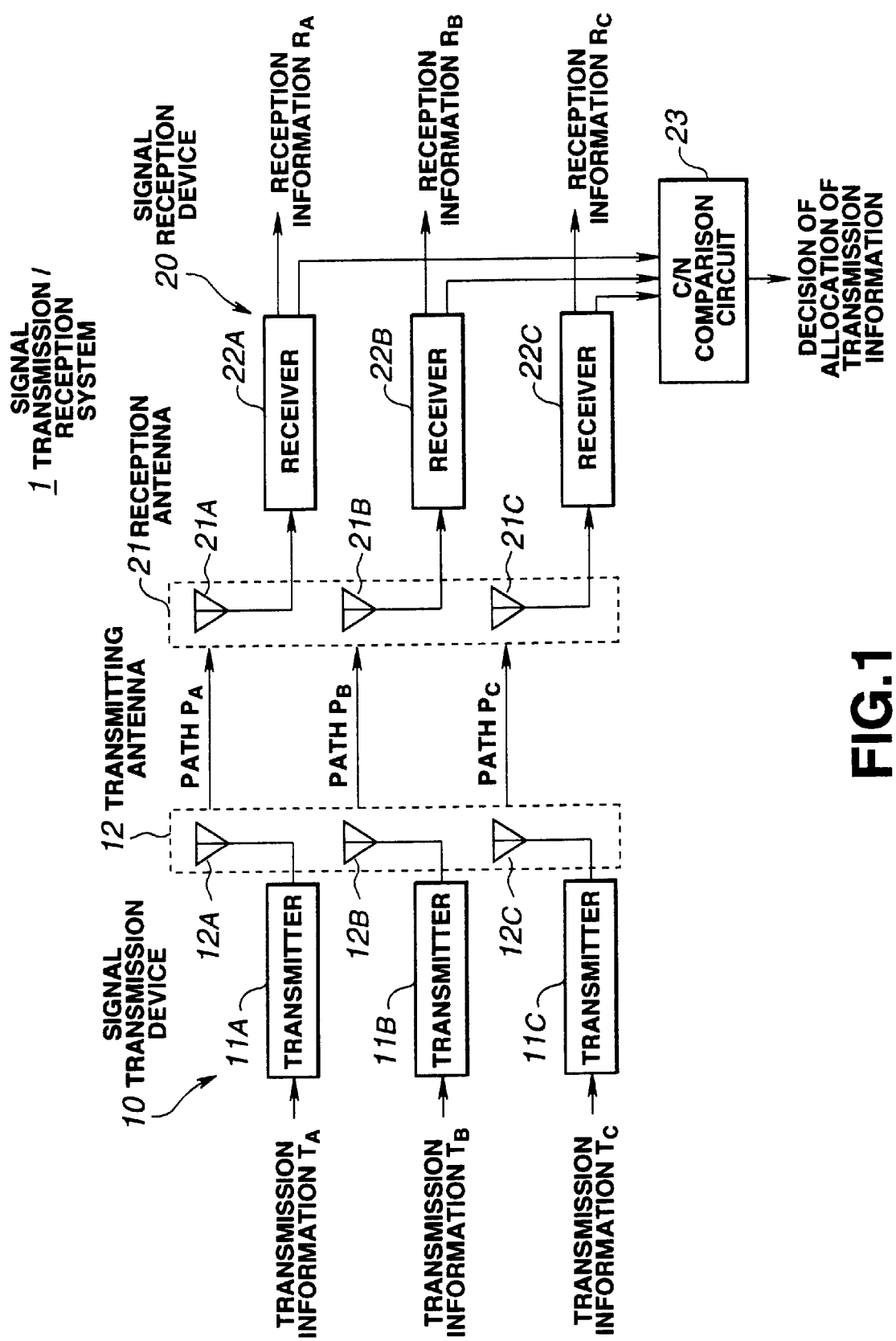
FIG. 1 is a block diagram showing a first embodiment of the signal transmission/reception device and method according to the present invention.

Referring to the drawings, preferred embodiments of a signal transmission/reception device and method according to the present invention will be explained in detail.

The first embodiment, directed to a signal transmission/reception system for transmitting three different transmission information items from a given site to some other site by the same frequency, at the same time point and within one and the same band, is now explained.

Referring to FIG. 1, this signal transmission/reception system 1 includes a signal transmitting device 10 for multiplexed transmission of three different items of the transmission information $T_A$, $T_B$ and $T_C$ from transmitters $11_A$, $11_B$ and $11_C$ over a transmission antenna 12 through three different paths $P_A$, $P_B$ and $P_C$. The signal transmission/reception system also includes a signal reception device 20 for receiving the three multiplexed different items of the information transmitted through the three different paths $P_A$, $P_B$ and $P_C$ by receivers $22_A$, $22_B$ and $22_C$ using a reception antenna 21 for producing three different items of the received information $R_A$, $R_B$ and $R_C$.

The three items of the transmitted information $T_A$, $T_B$ and $T_C$ are transmitted by electrical waves of the same frequency. If the transmission route is the same, these electrical waves interfere with one another, so that it is difficult to realize transmission with high signal quality. On the other hand, the multiplexed transmission by the above-mentioned FDMA, TDMA and CDMA is in need of a bandwidth broader than the original information bandwidth.

With this in view, the present signal reception system uses a multiplexing method which may be termed a path-division multiplexing method in which paths are independently different and different items of the information are carried on electric waves passing through the different paths.

A transmission antenna unit 12 of the signal transmission device 10 has three directive antennas $12_A$, $12_B$ and $12_C$ and hence has three different directivities. A receiving antenna unit 21 of the signal transmission device 20 also has three directive antennas $21_A$, $21_B$ and $21_C$ and hence has three different directivities.

The transmission side directive antennas $12_A$, $12_B$ and $12_C$ have directivities set in meeting with directive paths of the associated receiving directive antennas $21_A$, $21_B$ and $21_C$ respectively. The receiving directive antennas $21_A$, $21_B$ and $21_C$ suppress the intensity of the signals passing through the different paths to a sufficiently low level.

Figure 2:
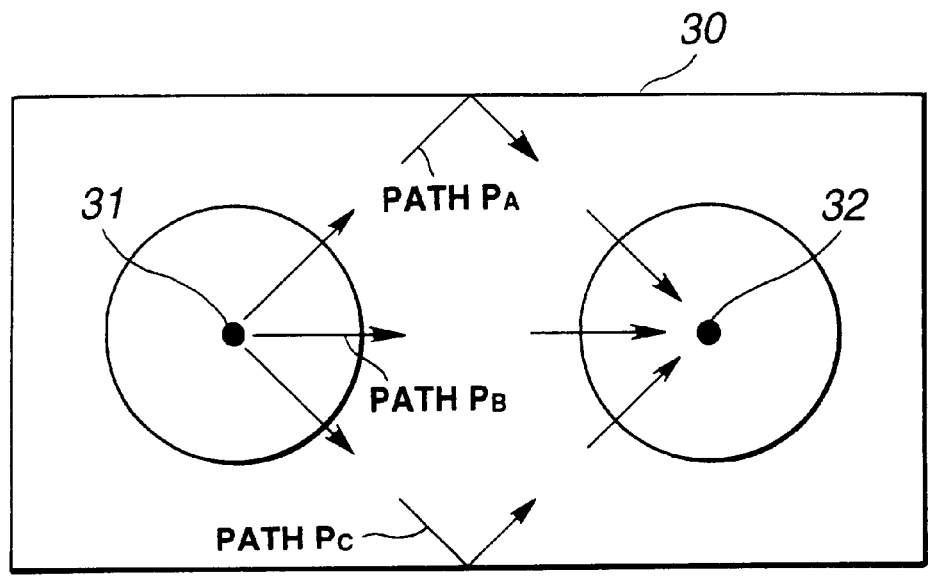
FIG. 2 illustrates the principle of the operation of the first embodiment of the signal transmission/reception system.
Figure 3:
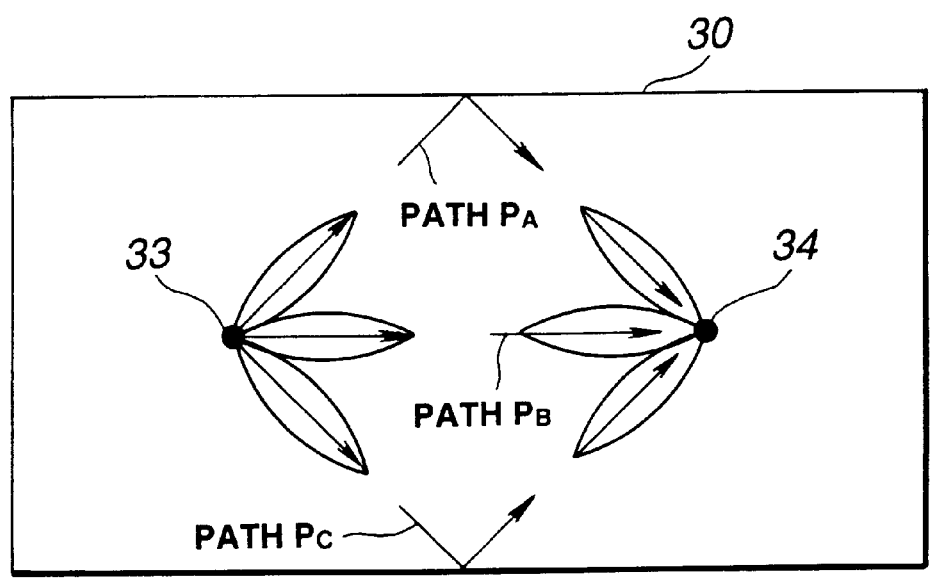
FIG. 3 illustrates, similarly to FIG. 2, the principle of the operation of the first embodiment of the signal transmission/reception system.

The principle of the path-division multiplexing method is now explained, with reference to FIGS. 2 and 3. In a portable telephone or a cordless telephone system, the electric waves arriving at the receiving antenna pass through plural paths, instead of through a sole path.

It is assumed, as an example, that three different paths $P_A$, $P_B$ and $P_C$ are present in a room 30. A receiving side non-directive antenna 32 receives a signal which is composed of three signals transmitted through three paths $P_A$, $P_B$ and $P_C$ independent from a transmitting side non-directive antenna 31, these three signals being overlapped together.

Thus, one set each of directive antennas are allocated at a transmission point 33 and at a reception point 34 to each of the three independent paths $P_A$, $P_B$ and $P_C$. That is, a set of directive antennas is allocated to the path $P_A$, while another set of directive antennas is allocated to the path $P_B$ and a further set of directive antennas is allocated to the path $P_C$ for transmitting respective independent information items, This secures an independent communication path for the antenna on the same site using the same frequency.

In the above-described first embodiment of the signal transmission/reception system 1, one set each of directive antennas are allocated at the signal transmission device 10 and at the signal reception device 20 to each of the three independent paths $P_A$, $P_B$ and $P_C$. That is, the directive antennas $12_A$ and $21_A$ are allocated to the path $P_A$, while the directive antennas $12_B$ and $21_B$ are allocated to the path $P_B$ and the directive antennas $12_C$ and $21_C$ are allocated to the path $P_C$, for having different information items carried by the electric waves passing through three different paths for multiplex transmission of the three different information items using the same frequency.

Thus, with the present signal transmission/reception system 1, the communication capacity can be increased without enlarging the frequency domain under suppression of interference. This increases the frequency utilization efficiency in proportion to the number of paths.

With the above-described signal transmission/reception system 1, reception directivities of the reception side directive antennas $21_A$, $21_B$ and $21_C$ and those of the transmission side directive antennas $12_A$, $12_B$ and $12_C$ need to be set appropriately in the directions of the paths $P_A$, $P_B$ and $P_C$ respectively. A sequence of setting the directivities at the communication start time is required, while haphazard directivity setting cannot lead to successful communications.

If an antenna of fixed directivity, such as Yagi antenna, is used, it is possible for the transmitting side to rotate an element in search of a proper direction of reception by the receiving side, which then is non-directive. Thus, with the present method, the direction of the transmission antenna directivity can be set first. It is not critical which side antenna directivity is to be set first.

In order for the directivities of the receiving side directive antennas $21_A$, $21_B$ or $21_C$ to follow up with changes in the paths $P_A$, $P_B$ or $P_C$ relative to changes in the arriving directions, the receiving side directive antennas $21_A$, $21_B$ and $21_C$ can be rotated mechanically by a servo motor.

Figure 4:
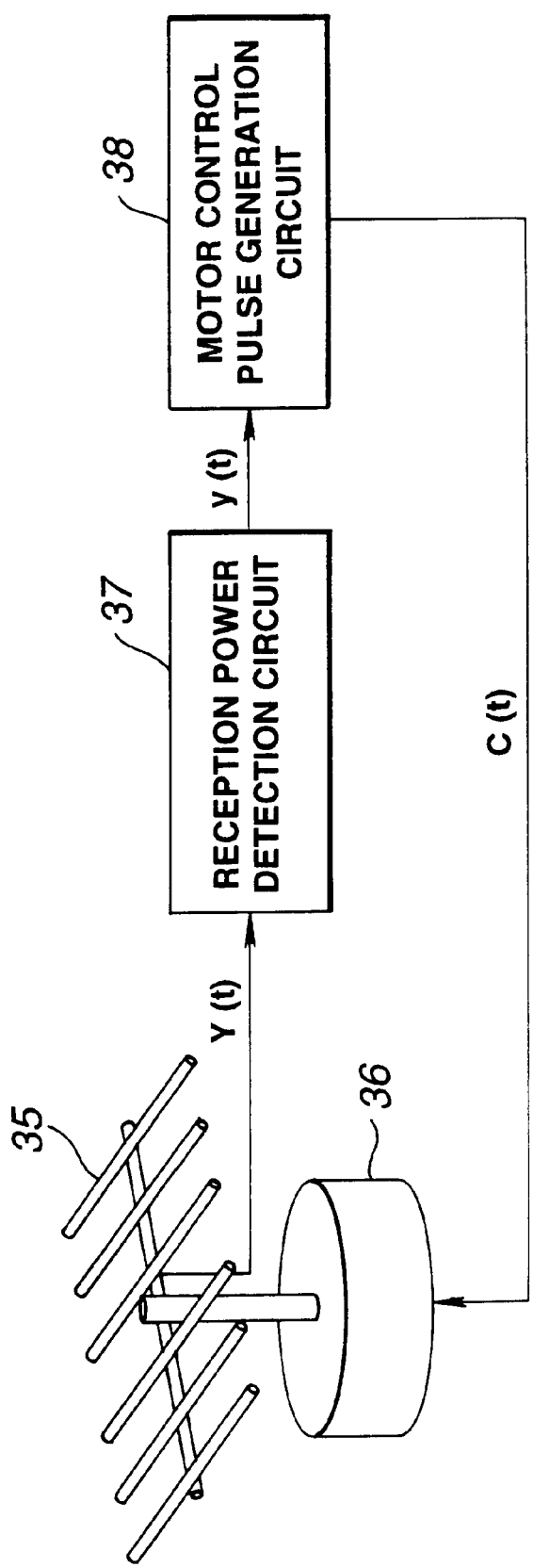
FIG. 4 is a schematic view showing a controller for mechanically rotating a receiving side antenna in the first embodiment.

FIG. 4 shows a control device for mechanically rotating a directive antenna 35 by a sole servo motor 36. In this control device, a reception signal Y(t) from the antenna 35 is fed to a reception power detecting circuit 37 for calculating a reception power detecting output $y(t)=|Y(t)|^2$. A motor control pulse generating circuit 38 generates a motor control pulse C(t), based on the reception power detecting output y(t), for supplying the generated pulse to the servo motor 36, which then is responsive to the motor control pulse C(t) to rotate the antenna 35 at a pre-set pitch towards left or right.

Figure 5:
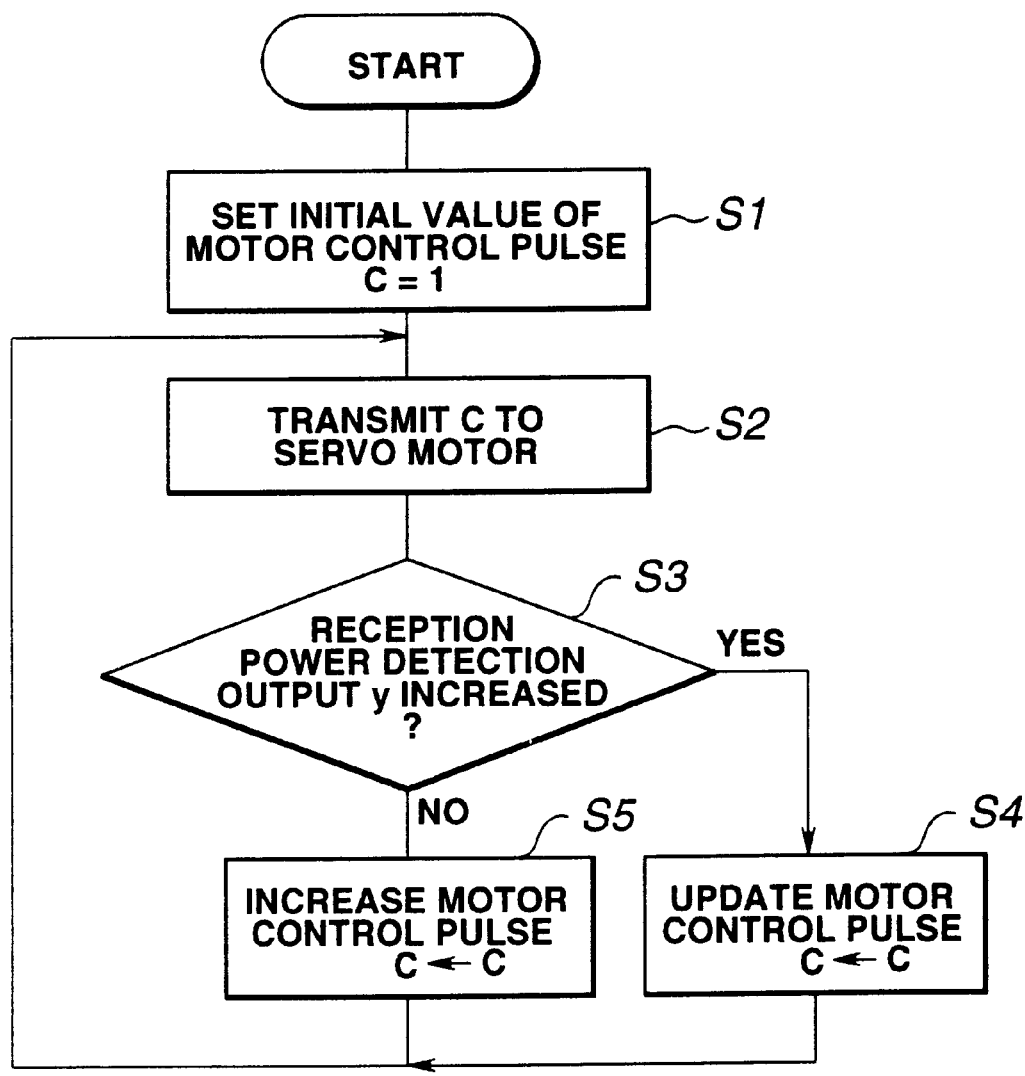
FIG. 5 is a flowchart for illustrating the operation of the controller shown in FIG. 4.

The motor control pulse generating circuit 38 constitutes a control circuit and controls the operation of the control device in accordance with the flowchart of FIG. 5. First, at step S1, an initial value of the motor control pulse C is set to 1 (C=1). Then, at step S2, the motor control pulse is transmitted to the servo motor 36.

The servo motor 36 then rotates the antenna 35 clockwise by one pitch. It is noted that clockwise rotation of the antenna occurs when the motor control pulse C(t) is +1, while counterclockwise rotation thereof occurs when the motor control pulse C(t) is −1.

On rotation of the antenna 35, the motor control pulse generating circuit 38 judges whether or not the reception power detecting output y(t) as detected by the reception power detecting circuit 37 has been increased. If the reception power detecting output y(t) is found to have been increased, the motor control pulse generating circuit 38 at step S4 updates the motor control pulse C. On the other hand, if the reception power detecting output y(t) cannot be found to have been increased, the motor control pulse generating circuit 38 at step S5 increments the motor control pulse C by +1, for example, for controlling the rotation of the servo motor 36 to control the rotation of the servo motor 36 to rotate the antenna 35 by one pitch. The processing as from step S2 to step S5 then is repeated.

Figure 6:
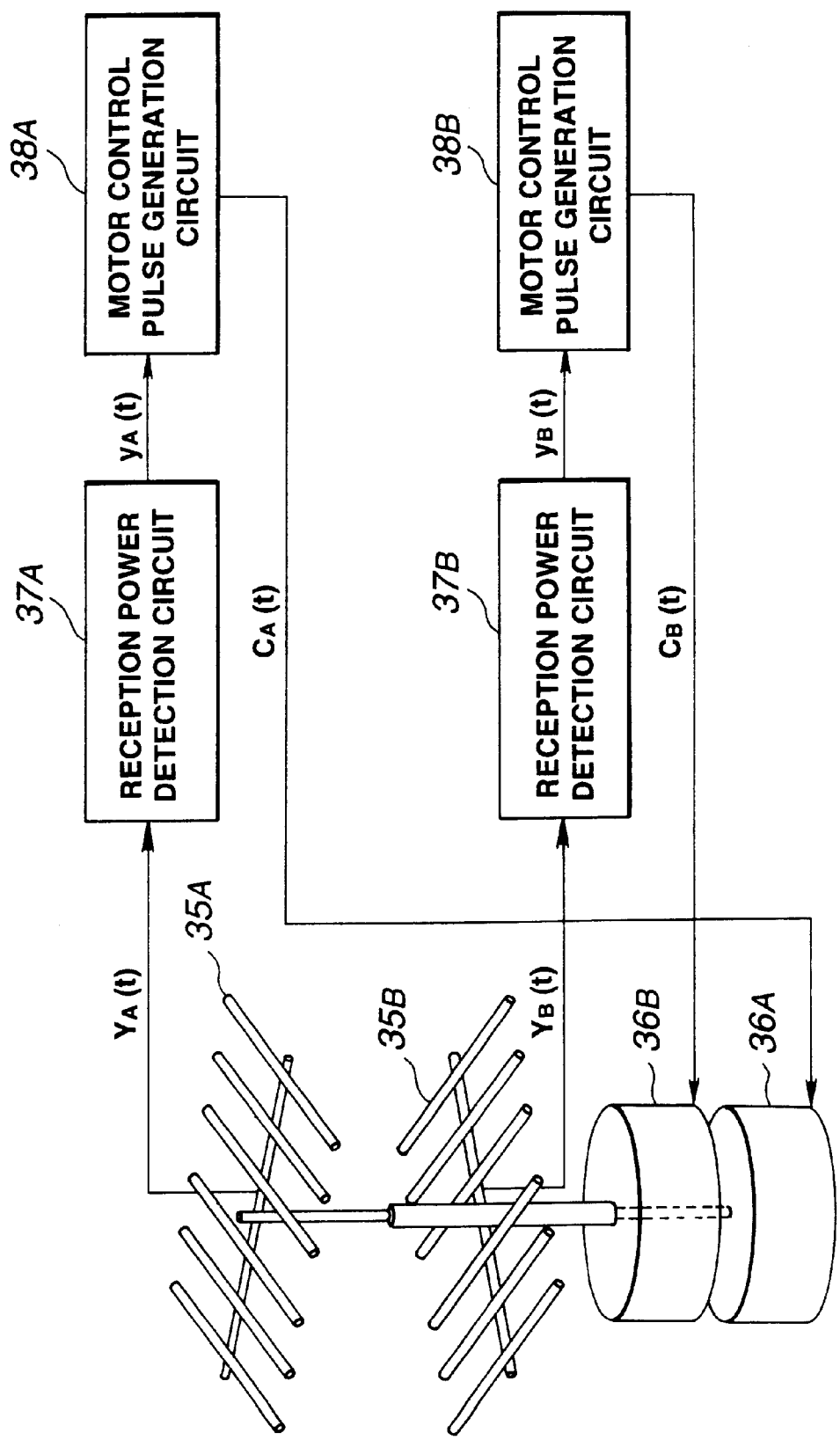
FIG. 6 is a schematic view of a controller for coping with two receiving side antennas.

If there are plural, such as two, directive antennas, it suffices if a reception power detecting circuit 37A or a reception power detecting circuit 37B and a motor control pulse generating circuit 3 8A or a motor control pulse generating circuit 38B are provided for each set of the antenna 35A or 35B and the servo motor 36A or 36B, as shown for example in FIG. 6.

As for directivity of the transmission antenna unit 12, it suffices if, after setting the directivity of the receiving antenna unit 21, the directivity antennas of the transmission antenna unit 12 are rotated under control by the control unit shown in FIG. 4 or 6 for maximizing the carrier to noise (C/N) ratio of each receiver.

Each of the three receivers $22_A$, $22_B$ and $22_C$ has a C/N measurement circuit. The results of comparison are compared by a C/N comparator circuit 23. The signal transmission device 10 allocates the information in the order of the decreasing value of priority to the transmitters $11_A$, $11_B$ and $11_C$ in the order of the decreasing magnitude of the C/N ratio of the paths $P_A$, $P_B$ and $P_C$.

The second embodiment is now explained. This second embodiment is directed to a signal transmission/reception system for transmitting three different parallel-converted information items from a given point to another given point with the same frequency, at the same time point and within the same area.

Figure 7:
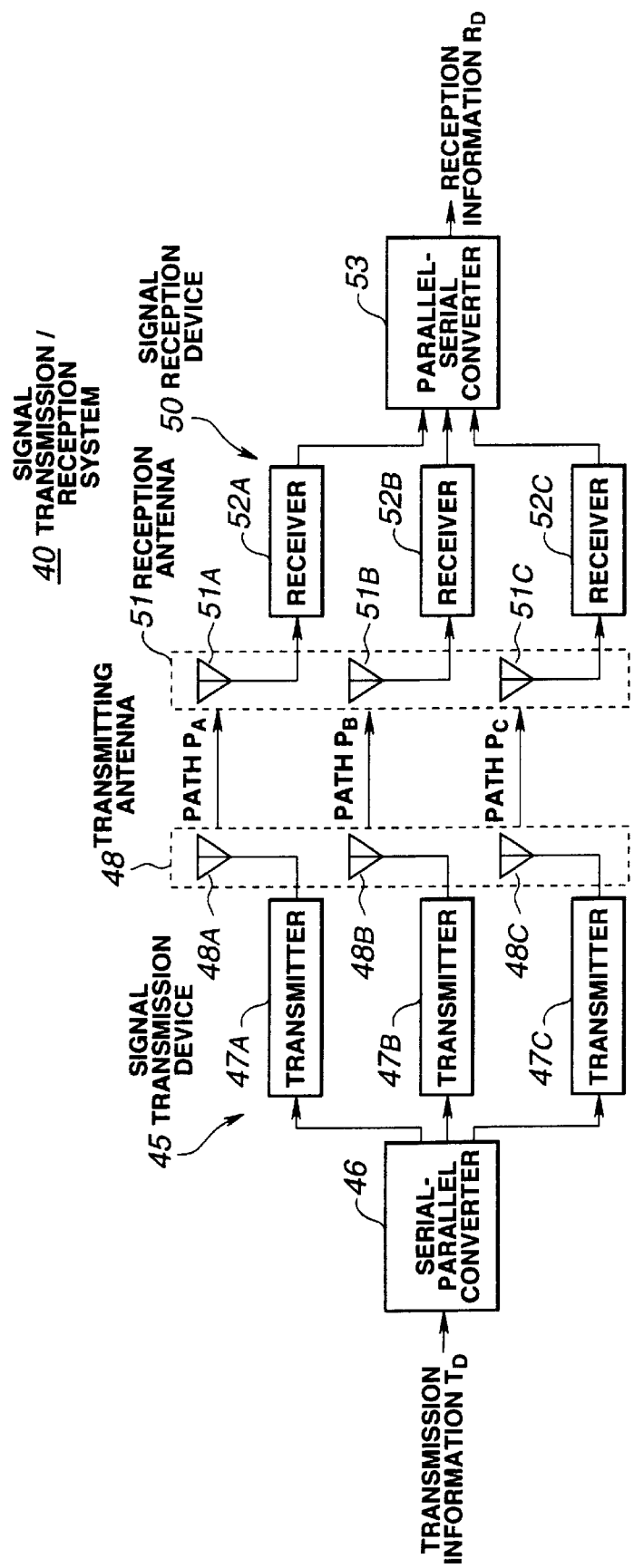
FIG. 7 is a block diagram showing a second embodiment of the signal transmission/reception device and method according to the present invention.
Figure 8:
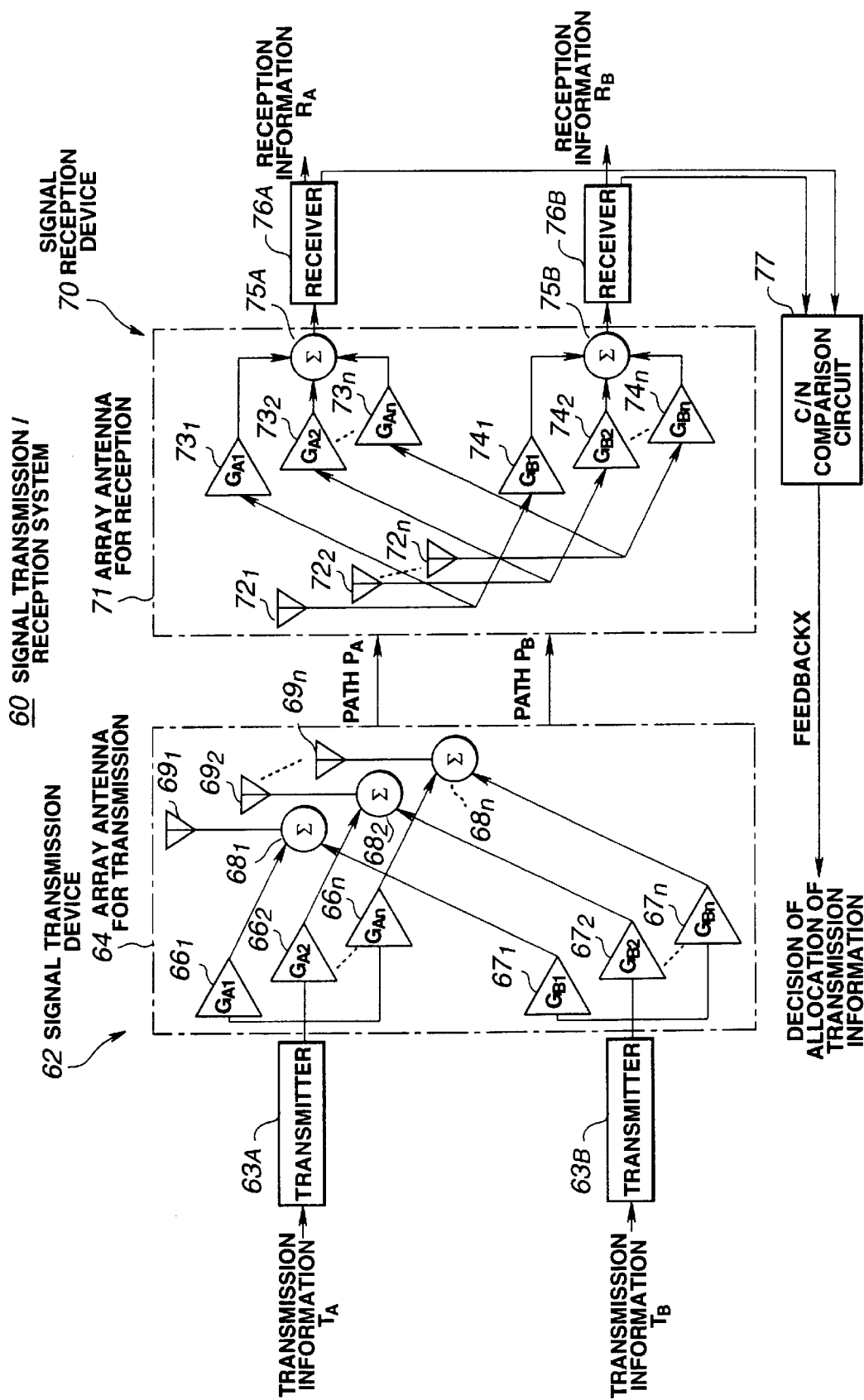
FIG. 8 is a block diagram showing a third embodiment of the signal transmission/reception device and method according to the present invention.

Referring to FIG. 7, this signal transmission/reception system 40 includes a signal transmission/reception device 45 for converting a given serially transmitted information item $T_D$ by a serial/parallel converter 46 into three parallel signals for path-division multiplexing transmission from three transmitters $47_A$, $47_B$ and $47_C$ over three different paths $P_A$, $P_B$, $P_C$ using the directivity antennas $48_A$, $48_B$ and $48_C$ of the transmitting antenna unit $48_C$ respectively. The signal transmission/reception system 40 also includes a signal receiving unit 50 for receiving the three parallel transmitted information items, sent over the three different paths $P_A$, $P_B$, $P_C$ by path-division multiplex transmission, with receivers $52_A$, $52_B$ and $52_C$ using directive antennas $51_A$, $51_B$ and $51_C$ of the reception antenna unit 51, and converting the received information items by a parallel/serial converter 53 into a sole serial reception information item $R_D$.

Similarly to those of the first embodiment, the transmission directive antennas $48_A$, $48_B$ and $48_C$ of the signal transmission/reception device 45 have directivities set in meeting with the directive paths of the reception detective antennas $51_A$ $51_B$ and $51_C$ of the associated signal receiving device 50. The receiving side directive antennas $51_A$, $51_B$ and $51_C$ suppress the intensity of the signals passed through the different paths to a sufficiently small level.

Thus, with the present signal transmission/reception system 40, a sole transmission information item $T_D$ is first converted into three parallel information items which are then sent by path-division multiplexing transmission over three independent paths $P_A$, $P_B$ and $P_C$. The receiving side then converts the three parallel information items into a sole serial information item $R_D$. Thus, one-third bandwidth suffices for transmitting the information for the same information rate, while the information volume can be trebled for the same bandwidth. That is, with the present signal transmission/reception system 40, the frequency utilization efficiency can be increased in proportion to the number of paths.

It should be noted that, with the present signal transmission/reception system 40, transmission directivity of the directive antenna for transmission and reception directivity of the directive antenna for reception need to be appropriately set in the respective path directions. At the communication start time, the sequence of operation for setting the directivity is required which is similar to that of the first embodiment of the the signal transmission/reception system 1.

In order for the receiving side directive antennas $51_A$, $51_B$ and $51_C$ to follow up with changes in the paths $P_A$, $P_B$ or $P_C$ or changes in the arrival direction, these receiving side directive antennas $51_A$, $51_B$ and $51_C$ an also be mechanically rotated by a servo motor, as explained with reference to FIGS. 4 to 6.

It should be noted that, after setting the directivity of the receiving antenna unit 51, the directivity of the transmission antenna unit transmission antenna unit 48 can be set for maximizing the C/N ratio of each receiver by rotating the directive antennas of the transmission antenna unit transmission antenna unit 48 under control by the control unit analog signals shown in FIGS. 4 and 6.

The third embodiment is now explained. This third embodiment is directed to a signal transmission/reception system for transmitting two different information items with the same frequency at the same time point in one and the same area from a given point to another given point with the use of an array antenna in each of the transmission and reception sides.

The signal transmission/reception system 60 includes a signal transmission device 62 for path-division multiplex transmission of two different items of transmission information $T_A$ and $T_B$ from two transmitters $63_A$, $63_B$ using a transmission array antenna 64 over two different paths $P_A$ and $P_B$, and a signal reception device 70 for receiving the two different items of transmission information $T_A$ and $T_B$ by path-division multiplex transmission over the two different paths $P_A$ and $P_B$ by receivers $76_A$, $76_B$ using a receiving array antenna 71 for producing two different items of the received items of information $R_A$ and $R_B$.

The array antenna means such an antenna comprised of an array of plural sensor array elements and having the function of adaptively changing the directivity to the prevailing electric wave environment in which the antenna is put by adjusting gain coefficients afforded to each sensor array element.

A transmission array antenna 64 includes coefficient multipliers $66_1$, $66_2$, ..., $66n$, for multiplying the transmission information $T_A$ from the transmitter $63_A$ with coefficients $G_{A1}$, $G_{A2}$, $G_{An}$ and coefficient multipliers $67_1$, $67_2$, ..., $67n$, for multiplying the transmission information $T_B$ from the transmitter $63_B$ with coefficients $G_{B1}$, $G_{B2}$, ..., $G_{Bn}$. The transmission array antenna 64 also includes adders $68_1$, $68_2$, ..., $68_n$ for summing together the results of multiplication obtained on multiplication with the coefficients by the coefficient multipliers $66_1$ $67_1$, $66_2$, $67_2$, $66_n$ and $67_n$. The transmission array antenna 64 also includes sensor array elements $69_1$, $69_2$, ..., $69_n$ for multiplying the sum outputs of these adders $68_1$, $68_2$, ..., $68_n$ with the coefficients $G_{A1}$, $G_{A2}$, ..., $G_{An}$, to output the resulting outputs (one outputs) via path $P_A$ to the reception array antenna 71 as electric waves, and for multiplying the sum outputs of these adders $68_1$, $68_2$, ..., $68n$ with the coefficients $G_{B1}$, $G_{B2}$, ..., $G_{Bn}$ to output the resulting outputs (other outputs) via path $P_B$ to the reception array antenna 71 as electric waves.

The reception array antenna 71 includes sensor array elements $72_1$, $72_2$, ..., $72_n$, for converting the transmission information $T_A$ and the transmission information $T_B$ transmitted via paths $P_B$ and $P_A$ and the electric waves concerning the information $T_A$ and $T_B$ into information signals, and coefficient multipliers $73_1$, $73_2$, ..., $73_n$ for multiplying n parallel outputs from the sensor array elements $72_1$, $72_2$, ..., $72_n$ with coefficients $G_{A1}$, $G_{A2}$, ..., $G_{An}$. The reception array antenna 71 also includes coefficient multipliers $74_1$, $74_2$, ..., $74_n$ for multiplying n parallel outputs with coefficients $G_{B1}$, $G_{B2}$, ..., $G_{Bn}$ and an adder $75_A$ for synthesizing outputs of the coefficient multipliers $73_1$, $73_2$, ..., $73_n$ and an adder $75_B$ for synthesizing outputs of the coefficient multipliers $74_1$, $74_2$, ..., $74_n$.

Figure 9:
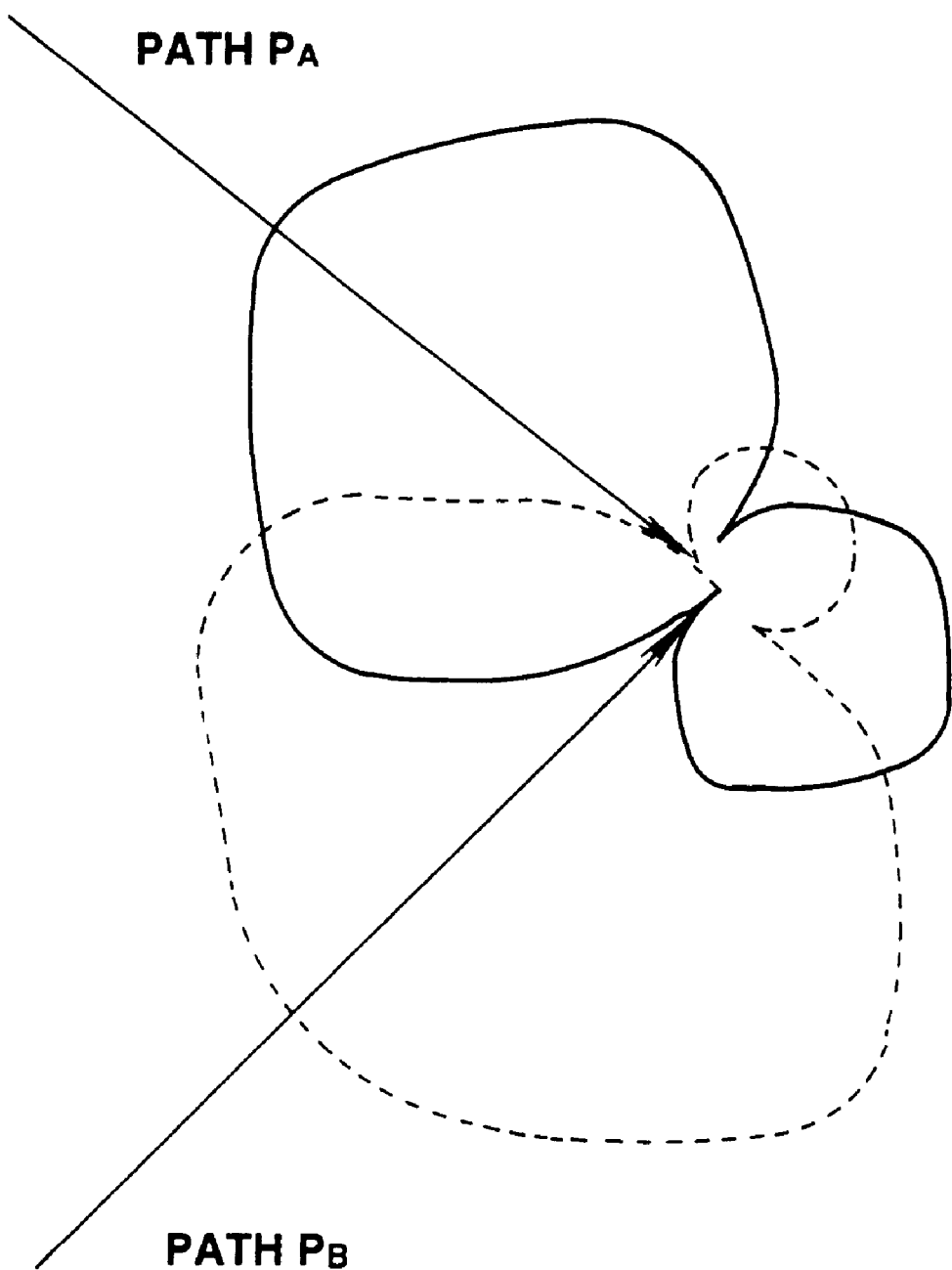
FIG. 9 is a graph showing directivity characteristics of a receiving array antenna employed in the third embodiment.

The array antenna 71 for reception adjusts the coefficients $G_{A1}$, $G_{A2}$, ..., $G_{An}$ so as to give directivity indicated by a solid line for the path $P_A$. The array antenna 71 for reception also adjusts the coefficients $G_{B1}$, $G_{B2}$, ..., $G_{Bn}$ so as to give directivity indicated by a solid line for the path $P_B$. The solid-line directivity for the path $P_A$ has a null point for the path $P_B$, while the broken-line directivity for the path $P_B$ has a null point for the path $P_A$, as shown in FIG. 9. That is, the lobe need not be sharp for the opposite side paths since the directivity need only be sufficient to attenuate the signals of the opposite side paths to a sufficient amplitude.

The above coefficients $G_{A1}$, $G_{A2}$, ..., $G_{An}$ and the coefficients $G_{B1}$, $G_{B2}$, ..., $G_{Bn}$ are adjusted so that the array antenna for reception 71 will have directivity as indicated in FIG. 9.

That is, the above coefficients $G_{A1}$, $G_{A2}$, ..., $G_{An}$ are adjusted so that the array antenna for reception 71 will have directivity as shown by a solid line for the path $P_A$. The above coefficients $G_{B1}$, $G_{B2}$, ..., $G_{Bn}$ are adjusted so that the array antenna for reception 71 will have directivity as indicated by a broken line for the path $P_A$. The solid-line directivity for the path $P_B$ has a null point for the path $P_B$, while the broken-line directivity for the path $P_B$ has a null point for the path $P_A$. That is, the lobe need not be sharp for the opposite side paths since the directivity need only be sufficient to attenuate the signals of the opposite side paths to a sufficient amplitude.

In the array antenna for reception 71, if the input voltages from the sensor array elements $72_1$, ..., $72_n$ are $x_{Ai}(t)$, an output voltage $x_A(t)$ output by the adder $75_A$ is given by $$y_A(t)=\Sigma G_{Ai} \times x_{Ai}(t)$$

where i denotes 1 to n.

On the other hand, if the input voltages from the sensor array elements $72_1$, $72_2$, ..., $72_n$ are $x_{Bi}(t)$, an output voltage $y_B(t)$ output by the adder $75_B$ is given by $$y_B(t)=\Sigma G_{Bi} \times x_{Bi}(t)$$

where i denotes 1 to n.

In the receiver $76_A$, the reception information $R_A$ is obtained from the output voltage $y_A(t)$, whereas, in the receiver $76_B$, the reception information $R_B$ is obtained from the output voltage $y_B(t)$ It should be noted that the above coefficients are set for maximizing the C/N ratio of the signal of the required path and for minimizing the BER. At this time, the directivity is set for enlarging the gain in the arrival direction of the desired waves and for diminishing the gain in the direction of the arriving waves passing through a different path which will be smaller at the above-mentioned null point.

With the array antenna, a non-directive pattern can be produced using only a sole sensor array element. The sequence of operations for setting the transmission directivity and reception directivity appropriately for respective paths is carried out beginning from the directivity of the reception antenna because of the excessively large degree of freedom of the directive pattern. The reason is that it is not clear at the outset which pattern should be set in the transmission pattern, that is in which direction transmission should occur strongly and in which direction transmission should cease to occur.

In the case of the array antenna, a non-directive pattern can be produced using only a sole sensor array element. It is possible to transmit signals non-directively and to select several suitable directivities on the receiving side. Then it is sufficient if the directivity of the transmitting antenna is set properly for sending out the separate information in the directions of the respective paths.

Referring to FIG. 10, an illustrative example of setting the directivity of the transmission side and the reception side sets of the array antennas is explained. This method sets the transmission and reception antenna pairs so that these antenna pairs will have opposite directivities.

Figure 10A:
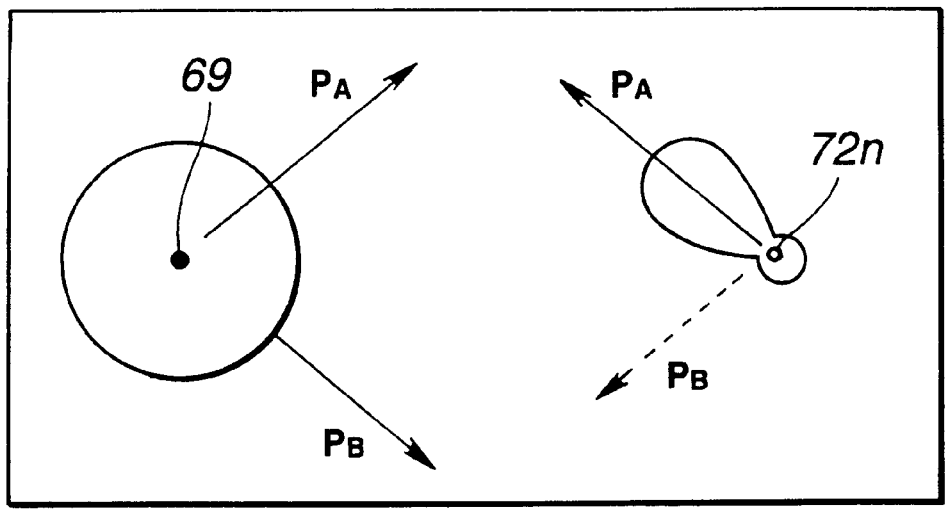
FIGS. 10A and 10B illustrate a typical sequence of setting the array antenna directivity in the third embodiment.

First, the directivity of the reception antenna is set. Referring to FIG. 10A, suitable coefficients $G_{A1}$, $G_{A2}$, ..., $G_{An}$, $G_{B1}$, $G_{B2}$, ..., $G_{Bn}$ are used in the coefficient multipliers $66_1$, $66_2$, ..., $66_n$, $67_1$, $67_2$, ..., $67_n$ and a sole sensor array element 69 is used.

The sensor array element $72_n$ accords suitable coefficients $G_{A1}$, $G_{A2}$, ..., $G_{An}$ by the coefficient multipliers $73_1$, $73_2$, ..., $73_n$ for matching the directivity to the optimum path $P_A$ of the paths $P_B$ and $P_A$.

On the other hand, the sensor array element $72_n$ accords suitable coefficients $G_{B1}$, $G_{B2}$, ..., $G_{Bn}$ by the coefficient multipliers $74_1$, $74_2$, ..., $74_n$ for matching the directivity to the optimum path $P_B$ of the paths $P_B$ and $P_A$. This completes setting of the directivity of the reception antenna.

Figure 10B:
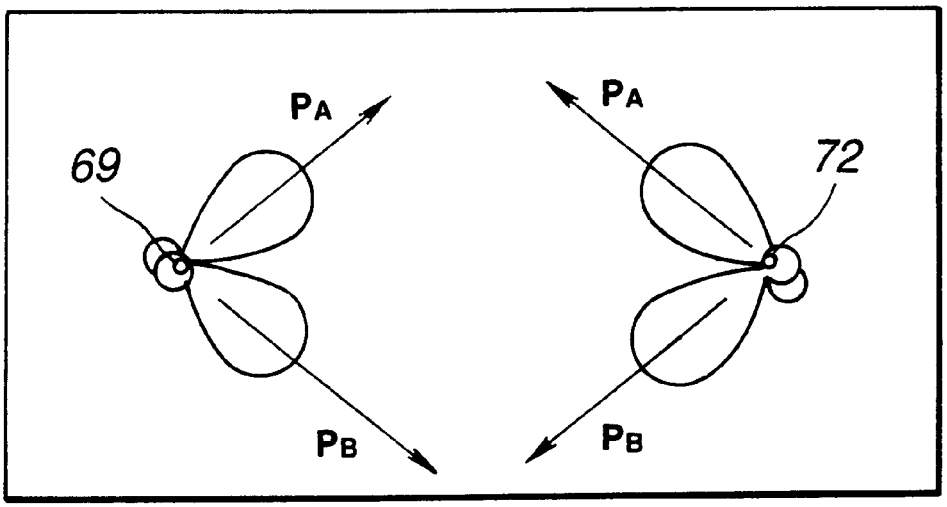

The directivity of the transmission antenna is then set as shown in FIG. 10B. The directivity of the reception antenna is that previously set by the above sequence of operations.

The pre-set coefficients are accorded to the transmission antenna as coefficients and a training sequence is sent in order to find the C/N ratio of the reception output at this time.

Other coefficients are accorded to the transmission antenna as coefficients for similarly finding the C/N ratio of the reception output. This sequence of operations is repeated several times to select two coefficients which will give optimum C/N for setting the selected coefficients on the sensor array elements $69_n$.

In order for the directivity of the array antenna for transmission array antenna 64 to be such directivity capable of securing sufficient C/N on the receiving side for each path, the error information such as BER or the C/N ratio on the receiving side needs to be fed back to the transmission side.

For controlling the array antenna directivity, a least mean square error (LMS) method, a constrained power minimization (CPM) method or a constant modulus algorithm (CMA) method, may be used.

Here, the LMS method is used, that is, a training sequence is sent as described above in order to find the C/N ratio of the reception output at this time. The training sequence is found as a time waveform as instantaneous voltage values. If the training sequence at this time is r(t), the receiving side controls the coefficients for minimizing the error $\epsilon(t)$, that is the mean square value of the difference $\epsilon(t)=y(t)-\gamma(t)$, where $\gamma(t)$ denotes the training sequence and y(t) is an actual output.

As a method for setting directivities of the transmitting and receiving side antenna sets, there is an illustrative method which will be hereinafter explained with reference to FIG. 11. FIG. 11 shows an instance in which the transmitting frequency is equal to the receiving frequency and transmission and reception occur alternately.

Figure 11A:
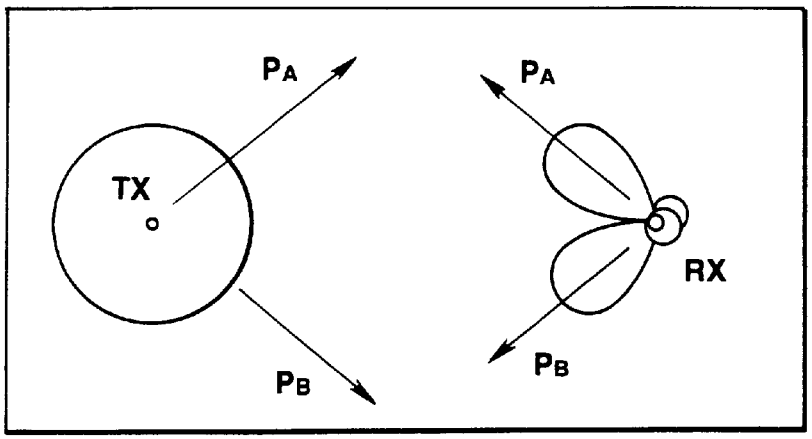
FIGS. 11A, 11B and 11C illustrate another typical sequence of setting the array antenna directivity in the third embodiment.
Figure 11B:
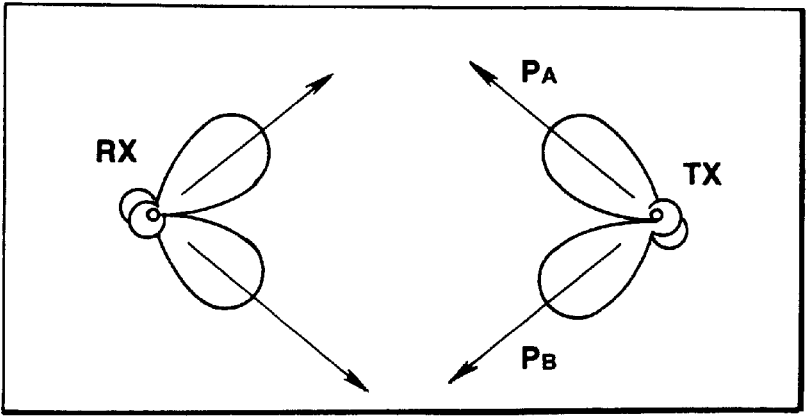
Figure 11C:
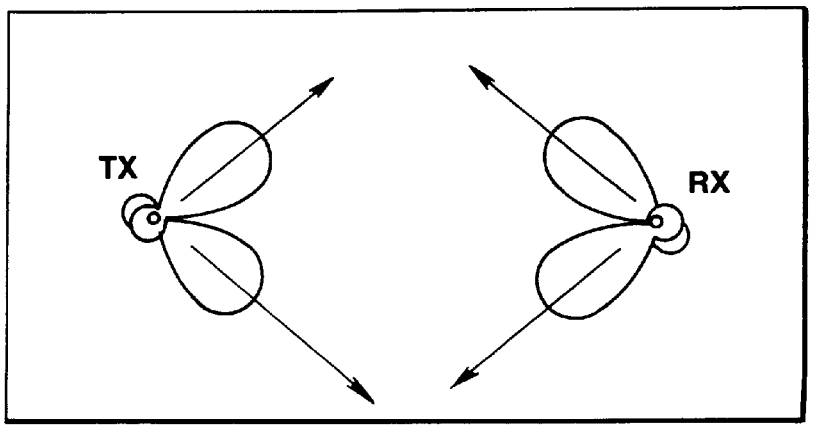

First, the transmitting side TX is set to be non-directive and the directivity of the receiving side RX has its directivity set by controlling its coefficients, as shown in FIG. 11A. The transmission and reception are then interchanged, as shown in FIG. 11B. The coefficients used for reception are used as coefficients for the transmitting side TX. Since the antenna used so far on the transmitting side is now changed over to the receiving side, its coefficients are found. The transmission and reception are then again interchanged, as shown in FIG. 11C, and the coefficients are used for the transmission side.

In the signal transmission reception system, according to the third embodiment, the transmitting information $T_A$ and the transmitting information $T_B$ entering the transmitters $63_A$ and $63_B$ may be the information converted in parallel during the preceding stage. Specifically, the transmitting information $T_A$ and the transmitting information $T_B$ are inherently the same serial information and are converted by the preceding stage serial/parallel converter into two parallel information items, namely the transmitting information $T_A$ and the transmitting information $T_B$, which are transmitted by the transmission array antenna 64 to the signal reception device 70 so as to be passed through the paths $P_A$ and $P_B$. The signal reception device 70 synthesizes the reception information $R_A$ and the reception information $R_B$ obtained by the receivers $76_A$ and $76_B$ by a parallel/serial converter of the succeeding stage to obtain a sole reception information item.

In this case, the frequency utilization efficiency can be improved in proportion to the number of paths, as in the signal transmission/reception system 40 described above.

The two receivers $76_A$ and $76_B$ each have a C/N ratio measurement circuit. The results of comparison by these circuits are compared by the C/N comparator circuit, The signal transmission device signal transmission device 62 allocates the information of higher order in transmission sequence to the transmitters $63_A$ and 63b in the order of decreasing C/N ratio.

What is claimed is:

1. A signal transmission/reception device comprising:
    a transmitting antenna having N transmission directivities;
    N transmission means associated with the N transmission directivities of said transmitting antenna for transmitting N different parallel information items via N different paths associated with the N transmission directivites of said transmitting antenna;
    a receiving antenna having N reception directivities associated with the respective N transmission directivities of said transmitting antenna; and
    N reception means associated with the N reception directivities of said receiving antenna for receiving the N different information items transmitted from said N transmission means via the N different paths associated with the N transmission directivities of said transmitting antenna via said receiving antenna with the N reception directivities as multiplexed signals.

2. The signal transmission/reception device as claimed in claim 1 wherein each transmission means has carrier to noise ratio measurement means for measuring carrier to noise ratio values and supplying measured carrier to noise ratio values, and carrier to noise ratio comparator means for comparing the measured carrier to noise ratio values, and the transmitting side allocates information of higher priority in an order of decreasing carrier to noise ratio value of the different paths.

3. The signal transmission/reception device as claimed in claim 1 wherein at least said receiving antenna is mechanically rotated to follow changes in the N different paths or arriving direction of electric waves.

4. The signal transmission/reception device as claimed in claim 2 wherein the transmission directivities are set to where a carrier to noise ratio of said reception means becomes maximum on rotating said transmitting antenna after setting the directivities of said receiving antenna.

5. The signal transmission/reception device as claimed in claim 1 further comprising:
    serial/parallel conversion means for splitting a sole information item into the N parallel information items to be transmitted by said N transmission means; and
    parallel/serial conversions means for converting the N parallel information items received by said N reception means into a single serial information item,
    wherein said N transmission means transmit the N parallel information items from said serial/parallel conversion means via said transmitting antenna over the N different paths as electric waves, and said N reception means receive the electric waves from the N different paths via said reception antenna and supply the received electric waves to be converted into the single serial information item by said parallel/serial conversion means.

6. The signal transmission/reception device as claimed in claim 5 wherein at least said receiving antenna is mechanically rotated to follow changes in the N different paths or arriving direction of the electric waves.

7. The signal transmission/reception device as claimed in claim 5 wherein the transmission directivities are set to where a carrier to noise ratio of said reception means becomes maximum on rotating the transmitting antenna after setting said directivities of said receiving antenna.

8. The signal transmission/reception device as claimed in claim 1 wherein said transmitting antenna or receiving antenna includes a set of array antennas which follow changes in the paths or in an arriving direction of electric waves.

9. The signal transmission/reception device as claimed in claim 8 wherein after a training sequence sent from said transmitting antenna is received, coefficients on the receiving antenna side are set and the reception directivites are set according to the received training sequence.

10. The signal transmission/reception device as claimed in claim 8 wherein, after setting the directivities of said receiving antenna, the directivities of said transmitting antenna are scanned and such transmission directivities are accorded to maximize a C/N ratio of said reception means.

11. The signal transmission/reception device as claimed in claim 8 wherein each transmission means has carrier to noise ratio measurement means for measuring carrier to noise ratio values and supplying measured carrier to noise ratio values, and carrier to noise ratio comparator means for comparing the measured carrier to noise ratio values, and the transmitting side allocates information of higher priority in an order of decreasing carrier to noise ratio value of the paths.

12. The signal transmission/reception device as claimed in claim 8 wherein the directivities of said receiving antenna are first set and then the transmission directivities are set using coefficients of said receiving antenna.

13. The signal transmission/reception device as claimed in claim 8 further comprising:

serial/parallel conversion means for splitting a sole information item into the N parallel information items to be transmitted by said transmission means; and parallel/serial conversion means for converting the N parallel information items received by said reception means into a single serial information item, wherein said N transmitting means transmit the N parallel information items from said serial/parallel conversion means via said transmitting antenna over the N different paths as electric waves, and said N reception means receive the electric waves from the N different paths over said reception antenna and supply the received electric waves to be converted into the single serial information item by said parallel/serial conversion means.

14. The signal transmission/reception device as claimed in claim 13 wherein after a training sequence sent from said transmitting antenna is received, coefficients on the receiving antenna side are set and the reception directivities are set according to the received training sequence.

15. The signal transmission/reception device as claimed in claim 13 wherein, after setting the directivities of said receiving antenna, the directivities of said transmitting antenna are scanned and such transmission directivities are accorded to maximize a carrier to noise ratio of said reception means.

16. The signal transmission/reception device as claimed in claim 13 wherein the directivities of said receiving antenna are first set and then the transmission directivities are set using coefficients of said receiving antenna.

17. A signal transmission/reception method comprising the steps of:

transmitting N different information items via N different paths associated with N transmission directivities of a transmission antenna;

receiving the transmitted information as a multiplexed signal by a receiving antenna having N reception directivites associated with the N transmission directivities of said transmission antenna;

dividing a single information item into N parallel information items as N stages of the N different information items;

receiving via said receiving antenna the N parallel information items as multiplexed signals; and converting the received parallel information items into a sole serial information item.

18. A signal transmission/reception method comprising the steps of:

transmitting N different information items via N different paths associated with N transmission directivities of a transmission antenna;

receiving the transmitted information as a multiplexed sianal by a receiving antenna having N reception directivities associated with the N transmission directivies of said transmission antenna;

mechanically rotating at least said receiving antenna to follow chanaes in the different paths or arriving direction of electric waves forming the multiplexed signal;

dividing a single serial information item into N parallel information items as N stages of the N different information items;

receiving via said receiving antennas the N parallel information items as multiplexed signals; and converting the N parallel information items received via said receiving antenna into a sole serial information item; wherein a set of array antennas which follow changes in the different paths or in an arriving direction of electric waves are used as said transmitting antenna or receiving antenna.

19. The signal transmission/reception method as claimed in claim 17 wherein a set of array antennas which follow changes in the different paths or in an arriving direction of electric waves are used as said transmitting antenna or receiving antenna.

* * * * *